Jan. 13, 1970     S. J. PRZYBYLKO     3,489,014
DIGITAL, ANALOG VORTEX SPEED SENSOR
Filed March 3, 1967     3 Sheets-Sheet 1
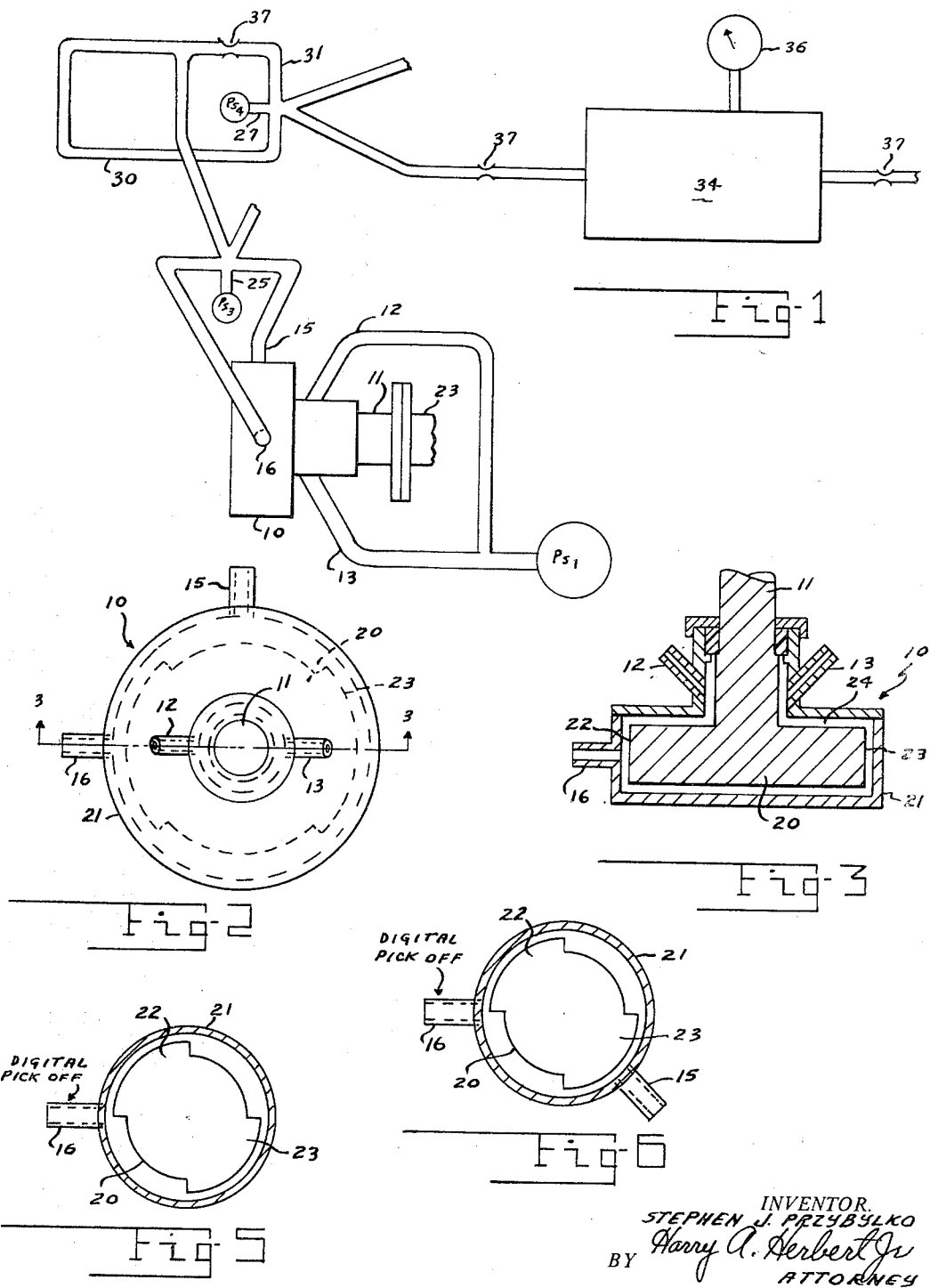
INVENTOR.
STEPHEN J. PRZYBYLKO
BY Harry A. Herbert Jr.
ATTORNEY
Richard J. Killoran
AGENT United States Patent Office 3,489,014
Patented Jan. 13, 1970

3,489,014
DIGITAL, ANALOG VORTEX SPEED SENSOR
Stephen J. Przybylko, South River, N.J., assignor to the United States of America as represented by the Secretary of the Air Force
Filed Mar. 3, 1967, Ser. No. 621,401
Int. Cl. G01p 7/00, 3/26
U.S. Cl. 73—506
2 Claims

ABSTRACT OF THE DISCLOSURE

A rotatable element having a larger diameter than the shaft to which it is attached is positioned within a closed cylindrical chamber. The rotating element has two segments located on opposite sides thereof with a larger radius than the remaining portion. An airflow passage is provided around the rotating element with the width of the passage being narrower adjacent the two segments of larger radius. An air input tube is provided on one side of the rotation element adjacent the input shaft with two outputs spaced 90° apart around the cylindrical chamber. An air flow is provided between the input and the outputs of the chamber. Rotation of the rotating element provides a digital output signal which is amplified, pulse shaped and applied to a speed indicator. An axial output tube may be provided opposite the input tube to provide an analog signal proportional to the speed of the rotating shaft.

---

The invention described herein may be manufactured and used by or for the United States Government for governmental purposes without the payment to me of any royalty thereon.

PRIOR ART

Fluidic systems have certain advantages over other systems in that they can provide reliable operation in certain adverse environments. A system for providing an analog signal proportional to the angular velocity of a rotating shaft is described in my copending application "Vortex Analog, Speed Sensor," Ser. No. 518,739, filed Jan. 4, 1966. Analog controls generally have quick response, but are not highly accurate. Digital systems are sometimes desirable because of their high accuracy though they generally have a slower response.

BRIEF SUMMARY OF THE INVENTION

According to this invention, a device is provided which gives a digital output with high reliability. The device of the invention may also be used to provide both a digital and an analog output signal without requiring two sensors.

One object of the invention is to provide a device which will give a digital fluid signal proportional to the angular velocity of a rotating shaft.

Another object of the invention is to provide a device which will give a digital fluid signal proportional to the angular velocity of a rotating shaft, which is compatible with other fluidic systems.

A further object of the invention is to provide a device which will produce simultaneously an analog signal and a digital signal proportional to the angular velocity of a rotating shaft.

These and other objects will be more fully understood from the following detailed description taken with the drawings.

DESCRIPTION OF THE DRAWINGS

FIG. 1 is a schematic fluid circuit partially in block form for the speed sensor of the invention;

FIG. 2 is an end view of the speed sensing unit of the device of FIG. 1 taken along the line 2—2;

FIG. 3 is a sectional view of the device of FIG. 2 taken along the line 3—3;

FIG. 5 is a schematic diagram of another embodiment of the sensor unit for the device of FIG. 1;

FIG. 6 is a schematic diagram of another embodiment of the sensor unit for the device of FIG. 1;

DESCRIPTION OF THE PREFERRED EMBODIMENT

Figure 4:
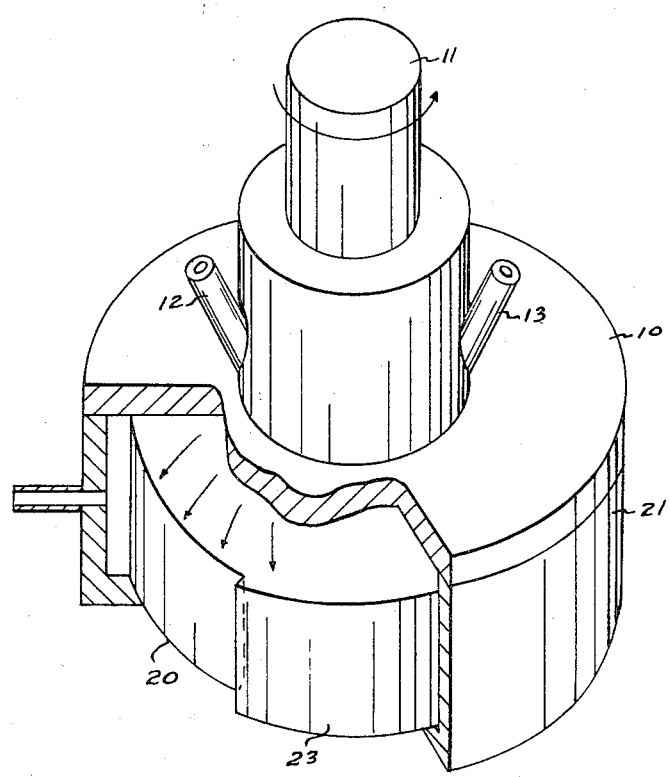
FIG. 4 is a partially cutaway, enlarged isometric view of the device of FIG. 2.

Reference is now made to FIG. 1 of the drawing which shows a vortex sensor unit 10 having a sensor shaft 11, coupled to an input shaft 23; a pair of input tubes 12 and 13; and a pair of output tubes 15 and 16 spaced 90° apart.

As shown in FIGS. 2 and 3, the vortex sensor unit 10 has a rotating element 20 which has a larger diameter than the shaft 11. The rotating element is located within a chamber 21 and has two teeth segment projections 22 and 23 extending approximately 90° around the periphery and spaced approximately 90° apart with the tooth segments having a larger radius than the remaining portion of the rotating element. The rotating element 20 is otherwise the same as in the copending application referenced above. An airflow passage 24 is provided around the rotating element 20. As a result of the output tubes being located 90° apart, a push-pull signal is produced as the teeth on rotating element 20 pass the output tubes 15 and 16.

The output tubes 15 and 16 are connected to a bistable fluid buffer amplifier 25. The output of buffer amplifier 25 is fed to a second bistable fluid amplifier 27. The width of the pulse in the output of amplifier 27 is determined by the difference in the lengths of lines 30 and 31, and the pulse width is independent of the frequency of the output of buffer amplifier 25.

The constant width pulses from fluid amplifier 27 are fed into a fluid capacitor 34 which integrates the signal and applies a pressure proportional to the speed of the shaft 11 to the indicator 36. Impedance elements 37 are provided where needed.

In the operation of the device of the invention, a fluent material such as air is supplied to input tubes 12 and 13 and passed out through output tubes 15 and 16. The portion of the flow passing out through tubes 15 and 16 is determined by the position of the teeth on rotating element 20 within the chamber 21, so that push-pull output pulses are applied to the buffer amplifier 25. The output of the buffer amplifier is fed to amplifier 27 which produces a constant width output pulse. The output of amplifier 27 is then fed into the fluid integrator capacitor 34 with the output of the integrator capacitor being applied to indicator 36 to provide an indication of shaft speed.

While the sensor unit 10 is shown as having two outputs, a single output could be provided as shown in FIG. 5 with a reference signal for buffer amplifier 25 being supplied from some other source. Also, for certain applications, the sensor unit could have more teeth on the rotating element 20 or could have the output positions at other than 90° for example such as shown in FIG. 6.

Figure 7:
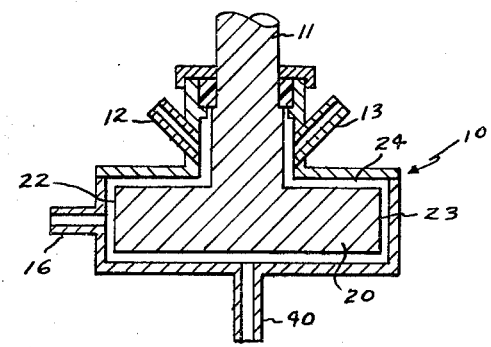
FIG. 7 is a sectional view showing how the device of FIG. 2 may be modified to be used to provide both a digital and an analog output signal.

It is to be understood that the sensor unit could also be used to provide both a digital output signal and an analog output signal as shown in FIG. 7, by providing an additional output tube 40. In this device, the digital portion operates in the same manner as described above and the analog signal is provided by the vorticity in the output as described in the referenced patent application Ser. No. 518,739.

Figure 8:
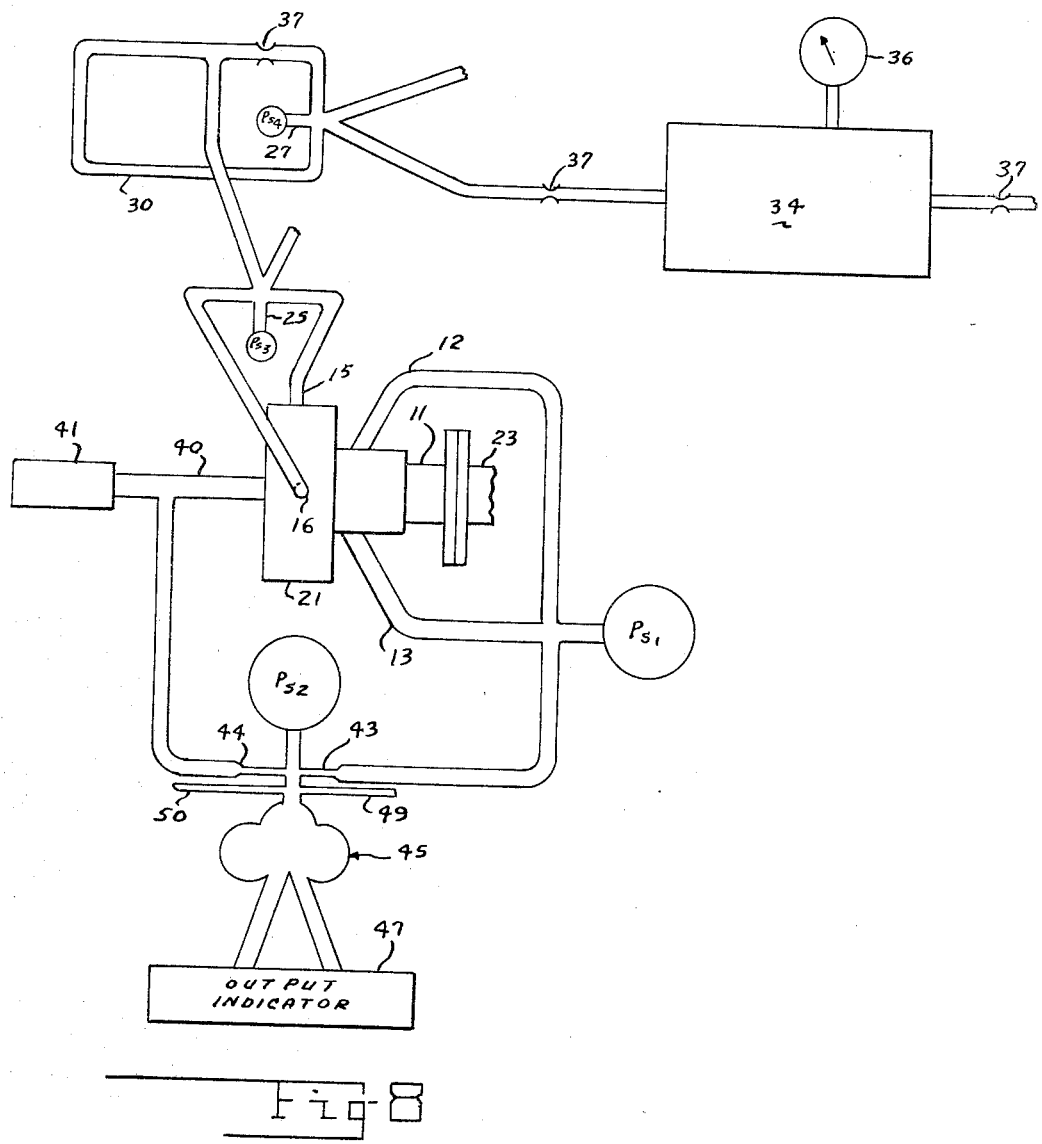
FIG. 8 is a schematic fluid circuit, partially in block form, showing the sensor of FIG. 4 used to produce both a digital and an analog output indication.

As shown in FIG. 8, the output tube 40 has a flow restricter 41 with the differential pressure across the vortex speed sensor being supplied to inputs 43 and 44 of a proportional summing amplifier 45, and the output of the proportional summing amplifier being supplied to a speed indicator 47. As pointed out above the digital systems provide higher accuracy though they have a slower response. Thus, the indicator 47 may be used for fast response with the indication from indicator 36 providing the more accurate indication, but with a slower response time. A control signal may be supplied to inputs 49 and 50 as described in the reference application. The remainder of the fluid circuit is the same as in FIG. 1.

While the device of FIG. 8 has been illustrated as providing separate speed indications, it is to be understood that the device of FIG. 7 could be used in a combined speed control system to provide a proportional plus integral control of the speed of a motor.

There is thus provided a device which gives digital and analog fluid signals proportional to the angular velocity of a rotating shaft.

While certain specific embodiments have been described in detail, it is obvious that numerous changes may be made without departing from the general principles and scope of the invention.

I claim:
1. A device for providing a fluid signal proportional to the angular velocity of a rotating shaft, comprising: a rotatable substantially cylindrical element, having a diameter larger than said shaft; said rotatable element having two projections thereon angularly positioned around the periphery at two diametrically opposed positions; means for connecting said rotatable element to said shaft; a housing surrounding said rotatable element and a portion of said shaft; said housing being spaced from said shaft and said rotatable element by a predetermined distance, to thereby provide an air passage, within said housing, around said shaft and said rotatable element; means for admitting a fluent material to said housing adjacent said shaft; two output tubes in the housing adjacent the periphery of said rotatable element and spaced around the housing approximately 90 degrees; a bistable buffer amplifier connected to said output tubes; a second bistable amplifier; means connected between said first bistable amplifier and said second bistable amplifier for providing a predetermined width output pulse from said second bistable amplifier; an indicating device; a fluid signal integrating means connected between said second bistable amplifier and said indicating device.

2. The device as recited in Claim 1 wherein said projections extend approximately 90 degrees around the periphery of said rotatable element, and wherein said housing has an additional output tube on the side of said rotatable element remote from said shaft; said additional output tube being coaxial with said rotatable element.

References Cited

UNITED STATES PATENTS

| | | | |
|---|---|---|---|
| 2,527,353 | 10/1950 | Christian | 73—523 XR |
| 2,857,150 | 10/1958 | Sharp | 73—523 XR |
| 2,939,401 | 6/1960 | Hodkin | 73—502 XR |
| 3,292,648 | 12/1966 | Colston | 73—523 XR |
| 3,339,571 | 9/1967 | Hatch | 137—81.5 |
| 3,409,032 | 11/1968 | Boothe et al. | 137—81.5 XR |

JAMES J. GILL, Primary Examiner

U.S. Cl. X.R.

73—521; 137—81.5